(12) United States Patent
Beals et al.

(10) Patent No.: US 10,970,367 B2
(45) Date of Patent: *Apr. 6, 2021

(54) STRONG AUTHENTICATION OF CLIENT SET-TOP BOXES

(71) Applicant: DISH Technologies L.L.C., Englewood, CO (US)

(72) Inventors: William Michael Beals, Englewood, CO (US); John Hamrick, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 131 days.

This patent is subject to a terminal disclaimer.

(21) Appl. No.: 16/401,348

(22) Filed: May 2, 2019

(65) Prior Publication Data

US 2019/0258779 A1    Aug. 22, 2019

Related U.S. Application Data

(63) Continuation of application No. 15/474,893, filed on Mar. 30, 2017, now Pat. No. 10,325,077.

(Continued)

(51) Int. Cl.
*G06F 21/10* (2013.01)
*H04N 21/426* (2011.01)
(Continued)

(52) U.S. Cl.
CPC ............ *G06F 21/10* (2013.01); *H04L 9/0861* (2013.01); *H04L 63/0435* (2013.01);
(Continued)

(58) Field of Classification Search
CPC .... G06F 21/10; H04L 63/047; H04L 63/0435
See application file for complete search history.

(56) References Cited

U.S. PATENT DOCUMENTS

| 5,768,539 A | 6/1998 | Metz et al. |
| 6,219,787 B1 | 4/2001 | Brewer |

(Continued)

FOREIGN PATENT DOCUMENTS

| EP | 1 688 834 A2 | 8/2006 |
| EP | 2 299 692 A1 | 3/2011 |
| WO | 2007/146763 A2 | 12/2007 |

OTHER PUBLICATIONS

CI Plus Specification v1.3. Content Security Extensions to the Common Interface., Jan. 14, 2011, XP055030907, Retrieved from the Internet: URL:http://www.ci-plus.com/data/ci-plus_specification_v1.3.pdf [retrieved on Jun. 25, 2012] p. 1-p. 25.

(Continued)

*Primary Examiner* — Dao Q Ho
(74) *Attorney, Agent, or Firm* — Kilpatrick Townsend & Stockton LLP

(57) ABSTRACT

Described herein are systems and methods for securing transmission of content from a smart card in a host television receiver to a client television receiver. The smart card can receive the encrypted content stream from the television service provider, decrypt the content stream with the global network key, identify the client television receiver as the destination of the content stream, generate a unique key specific to the content stream, encrypt the unique key with a local key known to the client television receiver, encrypt the content stream with the unique key, and transmit the encrypted content stream along with the encrypted unique key to the client television receiver. The client television receiver can then receive the encrypted content stream and the encrypted unique key, decrypt the unique key, decrypt the content stream with the unique key, and transmit the content stream to a display device of the client television receiver.

14 Claims, 6 Drawing Sheets

Related U.S. Application Data

(60) Provisional application No. 62/438,903, filed on Dec. 23, 2016.

(51) Int. Cl.

| | | |
|---|---|---|
| *H04N 21/436* | (2011.01) | |
| *H04N 21/6334* | (2011.01) | |
| *H04L 9/08* | (2006.01) | |
| *H04L 29/06* | (2006.01) | |
| *H04N 21/2347* | (2011.01) | |
| *H04N 21/258* | (2011.01) | |
| *H04N 21/266* | (2011.01) | |
| *H04N 21/418* | (2011.01) | |
| *H04N 21/4405* | (2011.01) | |
| *H04N 21/4408* | (2011.01) | |
| *H04N 21/61* | (2011.01) | |

(52) U.S. Cl.
CPC ...... *H04L 63/0464* (2013.01); *H04L 63/0853* (2013.01); *H04N 21/2347* (2013.01); *H04N 21/25816* (2013.01); *H04N 21/26613* (2013.01); *H04N 21/4181* (2013.01); *H04N 21/42623* (2013.01); *H04N 21/43607* (2013.01); *H04N 21/43615* (2013.01); *H04N 21/4405* (2013.01); *H04N 21/4408* (2013.01); *H04N 21/6143* (2013.01); *H04N 21/63345* (2013.01)

(56) References Cited

U.S. PATENT DOCUMENTS

| | | |
|---|---|---|
| 6,651,250 B1 | 11/2003 | Takai |
| 6,779,198 B1 | 8/2004 | Moringaga et al. |
| 10,171,870 B2 | 1/2019 | Beals |
| 10,325,077 B2 | 6/2019 | Beals |
| 2002/0099948 A1 | 7/2002 | Kocher et al. |
| 2003/0030581 A1 | 2/2003 | Roy |
| 2003/0084440 A1 | 5/2003 | Lownes |
| 2003/0108199 A1 | 6/2003 | Pinder et al. |
| 2003/0126400 A1 | 7/2003 | Debiez et al. |
| 2003/0219127 A1 | 11/2003 | Russ et al. |
| 2005/0226170 A1 | 10/2005 | Relan et al. |
| 2006/0107285 A1 | 5/2006 | Medvinsky |
| 2006/0161969 A1 | 7/2006 | Moreillon |
| 2006/0272022 A1 | 11/2006 | Loukianov et al. |
| 2007/0005506 A1 | 1/2007 | Candelore |
| 2007/0180464 A1 | 8/2007 | Dellow et al. |
| 2007/0294178 A1 | 12/2007 | Pinder et al. |
| 2008/0022299 A1 | 1/2008 | Le Buhan |
| 2008/0282345 A1 | 11/2008 | Beals |
| 2009/0019061 A1 | 1/2009 | Scannell, Jr. |
| 2009/0049220 A1 | 2/2009 | Conti |
| 2009/0157936 A1 | 6/2009 | Goss |
| 2009/0168996 A1 | 7/2009 | Candelore |
| 2009/0172806 A1 | 7/2009 | Natu |
| 2010/0169368 A1 | 7/2010 | Neill |
| 2011/0017825 A1 | 1/2011 | Beals |
| 2011/0138164 A1 | 6/2011 | Cha et al. |
| 2012/0120250 A1 | 5/2012 | Shintani et al. |
| 2012/0321080 A1 | 12/2012 | Candelore et al. |
| 2012/0321280 A1 | 12/2012 | Lin |
| 2013/0279694 A1 | 10/2013 | Gremaud et al. |
| 2014/0282685 A1 | 9/2014 | Beals et al. |
| 2015/0040155 A1 | 2/2015 | Gutta et al. |
| 2016/0050190 A1 | 2/2016 | Mooij et al. |
| 2018/0157865 A1 | 6/2018 | Beals |
| 2018/0184158 A1 | 6/2018 | Beals |
| 2018/0184159 A1 | 6/2018 | Beals et al. |
| 2018/0184176 A1 | 6/2018 | Beals et al. |
| 2018/0184177 A1 | 6/2018 | Beals et al. |

OTHER PUBLICATIONS

International Search Report and Written Opinion for PCT/US2017/068167 dated Apr. 17, 2018, all pages.
International Preliminary Report on Patentability for PCT/US2017/068167 dated Jun. 25, 2019, all pages.
International Search Report and Written Opinion for PCT/US2017/068150 dated Feb. 22, 2018, all pages.
International Preliminary Report on Patentability for PCT/US2017/068150 dated Jun. 25, 2019, all pages.
International Search Report and Written Opinion for PCT/US2017/062756 dated Feb. 28, 2018, all pages.
International Preliminary Report on Patentability for PCT/US2017/062756 dated Jun. 11, 2019, all pages.
International Search Report and Written Opinion for PCT/US2017/068173 dated Mar. 9, 2018, all pages.
International Preliminary Report on Patentability for PCT/US2017/068173 dated Jun. 25, 2019.
International Search Report and Written Opinion for PCT/US2017/068163 dated Mar. 26, 2018, all pages.
International Preliminary Report on Patentability for PCT/US2017/068163 dated Jun. 25, 2019, all pages.
U.S. Appl. No. 15/370,927, filed Dec. 6, 2016 Non-Final Rejection dated Jul. 2, 2018, all pages.
U.S. Appl. No. 15/370,927, filed Dec. 6, 2016 Final Rejection dated Feb. 8, 2019, all pages.
U.S. Appl. No. 15/370,927, filed Dec. 6, 2016 Notice of Allowance dated Jun. 18, 2019, all pages.
U.S. Appl. No. 15/394,537, filed Dec. 29, 2016 Non-Final Rejection dated Nov. 28, 2017, all pages.
U.S. Appl. No. 15/394,537, filed Dec. 29, 2016 Notice of Allowance dated Sep. 11, 2018, all pages.
U.S. Appl. No. 15/474,907, filed Mar. 30, 2017 Non-Final Rejection dated Jan. 7, 2019, all pages.
U.S. Appl. No. 15/474,903, filed Mar. 30, 2017 Non-Final Rejection dated Jan. 10, 2019, all pages.
U.S. Appl. No. 15/474,893, filed Mar. 30, 2017 Notice of Allowance dated Feb. 8, 2019, all pages.
U.S. Appl. No. 15/474,893, filed Mar. 30, 2017 Non-Final Rejection dated Oct. 29, 2018, all pages.
Silberschatz A. et al., "Operating System Concepts—Fourth Edition", Operating System Concepts, Jan. 1, 1994, pp. 28-35, XP002328940, the whole document.
Examination Report for EP Application No. 17835539.2 dated Aug. 4, 2020, all pages.
U.S. Appl. No. 15/474,903, filed Mar. 30, 2017, Notice of Allowance dated Jul. 17, 2019, all pages.
U.S. Appl. No. 15/474,907, filed Mar. 30, 2017, Notice of Allowance dated Jul. 17, 2019, all pages.
"Handbook of Applied Cryptography:, Chapter 1: Overview of Cryptography; Chapter 12: Key Establishment Protocols; Chapter 13: Key Management Techniques ED—Menezes A J; Van Oorschot P C; Vanstone S A", Jan. 1, 1996, Handbook of Applied Cryptography; [CRC Press Series on Discrete Mathematices and Its Applications], CRC Press, Boca Raton, FL, US, p. 22-23, 510, XP000863989, ISBN: 978-0-8493-8523-0.
Office Action for EP 17 832 158.4 dated Oct. 20, 2020, all pages.
Office Action for EP 17 832 156.8 dated Oct. 16, 2020, all pages.

STRONG AUTHENTICATION OF CLIENT SET-TOP BOXES

CROSS-REFERENCES TO RELATED APPLICATIONS

This Application is a continuation of U.S. patent application Ser. No. 15/474,893, entitled "STRONG AUTHENTICATION OF CLIENT SET-TOP BOXES," filed Mar. 30, 2017, which application claims the benefit of and priority to U.S. Provisional Application No. 62/438,903, entitled "STRONG AUTHENTICATION OF CLIENT SET-TOP BOXES," filed Dec. 23, 2016, which are incorporated herein by reference in their entirety for all purposes.

This Application is related to U.S. patent application Ser. No. 15/370,927, entitled "SMART CARD AUTHENTICATED DOWNLOAD," filed Dec. 6, 2016. This application is further related to U.S. patent application Ser. No. 15/474,903, entitled "SECURELY PAIRED DELIVERY OF ACTIVATION CODES FROM SMART CARD TO HOST SET-TOP BOX," filed Mar. 30, 2017, which application claims priority to U.S. Provisional Application No. 62/438,902, filed Dec. 23, 2016. This application is further related to U.S. patent application Ser. No. 15/474,907, entitled "SECURELY PAIRED DELIVERY OF ACTIVATION CODES FROM SMART CARD TO REMOTE CLIENT SET-TOP BOX," filed Mar. 30, 2017, which application claims priority to U.S. Provisional Application No. 62/438,908, filed Dec. 23, 2016.

BACKGROUND OF THE INVENTION

Television service providers distribute television services using television receivers located in television subscriber's homes. The television subscribers can have a host (i.e., main) television receiver which houses a smart card that can authenticate the subscriptions the television subscriber has paid for/subscribed to and control access to content based on the television subscriber's subscriptions. Television subscribers may wish to have televisions in multiple rooms capable of displaying content subscribed to from the television subscriber. To accommodate this functionality, client television receivers (also sometimes referred to as thin clients) can be used. Client television receivers do not have a smart card. In past systems, the client television receiver can receive content from the host television receiver, which houses the smart card. In such systems, typically the content is transmitted to the host television receiver, which is trusted by the smart card. The host television receiver can then transmit the content to the client television receiver. In such systems, however, the smart card may not know about the client television receiver or have control over the content transmitted to the client television receiver. Also, the transmission from the host television receiver to the client television receiver is not a strongly secure transmission. Such systems leave open many ways for signal thieves to access content and steal multiple streams of content for many different televisions without subscribing to or paying for the content or excessive use on multiple televisions. Therefore, there is a need to enable the smart card in a host television receiver to control access to content from client television receivers.

BRIEF SUMMARY OF THE INVENTION

Described herein are systems and methods for securing transmission of content from a television service provider through a smart card in a host television receiver to a client television receiver. The system can include a host television receiver housing a smart card with which the host television receiver can connect and communicate. The host television receiver can have a network interface. The smart card can include a security processor and a memory as well as a second processor and a second memory. Each memory can have instructions that can be executed by the security processor or the processor for performing steps for securing transmission of content from the television service provider to the client television receiver. The system can also include the client television receiver, which can include a display interface, a network interface, system on a chip ("SOC"), a client security processor, and a memory. The memory can have instruction that can be executed by the client security processor for performing steps for securing transmission of content from the television service provider to the client television receiver. The memory on the smart card can include instructions to receive an encrypted content stream from the television service provider via the host television receiver. The instructions can also include decrypting the content stream with a global network key. The instructions can also include identifying the client television receiver as the destination for the content stream, generating a dynamically generated item key specific to the client television receiver, encrypting the content stream with the dynamically generated item key, securely transmitting the dynamically generated item key to the client television receiver, and transmitting the content stream encrypted with the dynamically generated item key to the client television receiver via the host television receiver network interface.

Optionally, the memory on the client television receiver can include instructions to receive the content stream from the smart card, decrypt the content stream with the dynamically generated item key, and transmit the content stream to a display device via the display interface.

Optionally, the memory of the smart card can include instructions to pair the smart card with the client television receiver by receiving an authorization message containing an authorization code and a local key specific to the client television receiver. The smart card can store the local key specific to the client television receiver for use in communicating with the client television receiver. Optionally, before transmitting the dynamically generated item key to the client television receiver, the smart card can encrypt the dynamically generated item key with the local key.

Optionally, the system can include multiple client television receivers, and the smart card security processor can be configured to pair with a limited number of client television receivers. Optionally, the content stream can be transmitted from the smart card to the client television receiver over an untrusted network.

Optionally, the smart card memory can include instructions to receive a second encrypted content stream from the television service provider. The smart card can decrypt the second content stream with a second global network key, identify the host television receiver as the destination of the second content stream, generate a second dynamically generated item key specific to the host television receiver, encrypt the second content stream with the second dynamically generated item key, securely transmit the second dynamically generated item key to the host television receiver, and transmit the second content stream encrypted with the second dynamically generated item key to the host television receiver.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Television service providers can provide television services to subscribers using television receivers. Host television receivers typically utilize a smart card for controlling access to content by the host television receiver. In systems having client television receivers (i.e., thin clients) that can receive and provide television content but that do not have a smart card, the client television receiver typically receives the content from the host television receiver. In existing systems, a smart card can be paired with/married to only one television receiver—the host television receiver. Pairing with a single television receiver requires that all content be passed through the host television receiver because the smart card can only communicate with the host television receiver. As such, the host television receiver first decrypts content then adds a layer of encryption that is specific between the host television receiver and the client television receiver. The host television receiver can then transmit the content to the client television receiver after receiving it from the smart card. However, in such a system the smart card does not directly control access by the client television receiver, and the smart card may not even be aware of the client television receiver or what content the client television receiver is receiving or displaying. Described herein are systems for allowing the smart card in a host television receiver to directly control content transmitted to the client television receiver. There are many advantages to allowing the smart card to control content transmission to client television receivers, including the ability to encrypt content directly for the client television receiver to ensure it is properly secured, to control the content that is accessed by the client television receivers, and to control the number of client television receivers accessing content. As a result, the host television receiver processor does not need to be trusted for secure transmission of content to the client television receiver.

Figure 1:
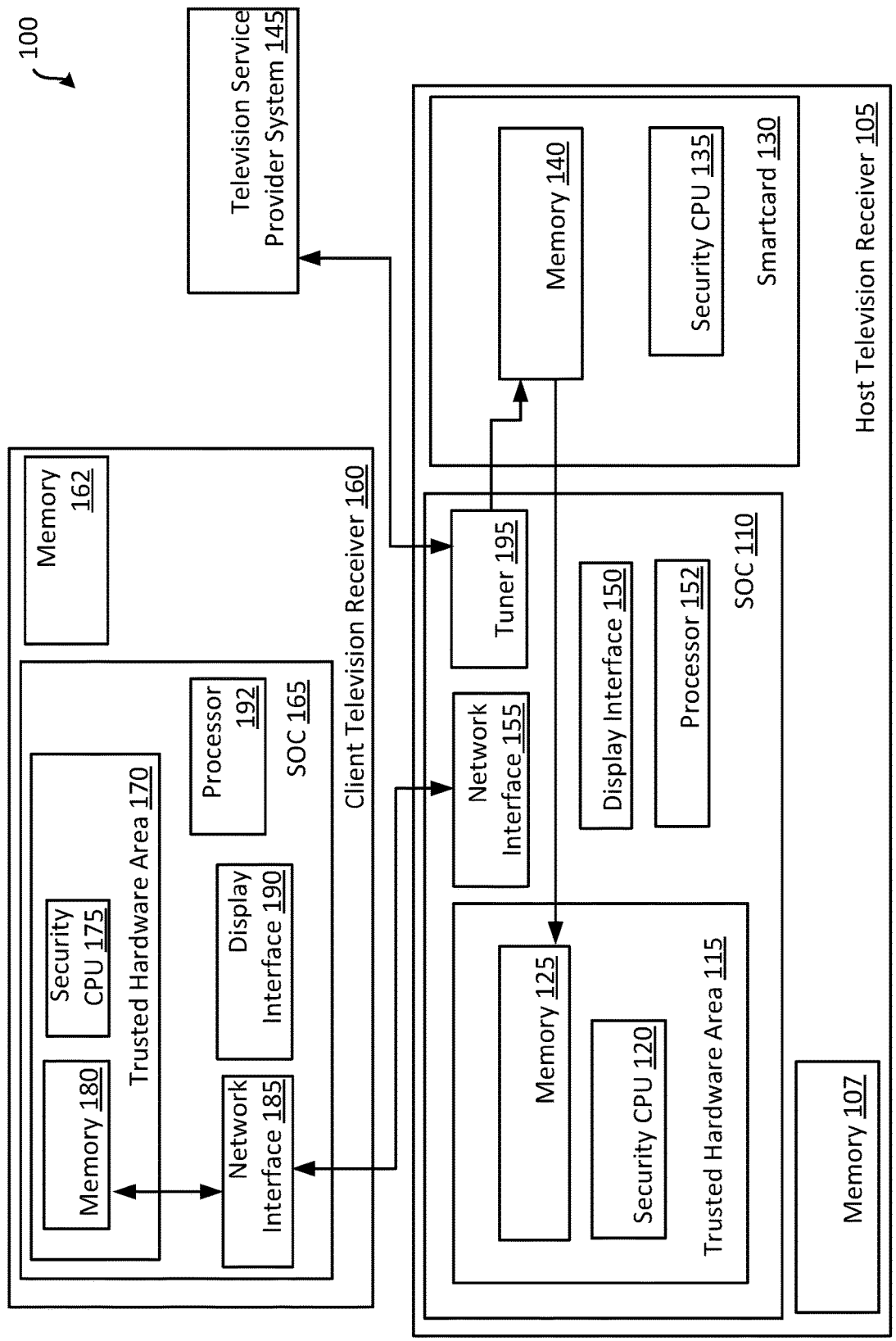
FIG. 1 illustrates an embodiment of a system for securing content to a client television receiver.

FIG. 1 illustrates an embodiment of a television service system 100. The television service system 100 can include a television service provider system 145, a host television receiver 105, and a client television receiver 160.

Figure 4:
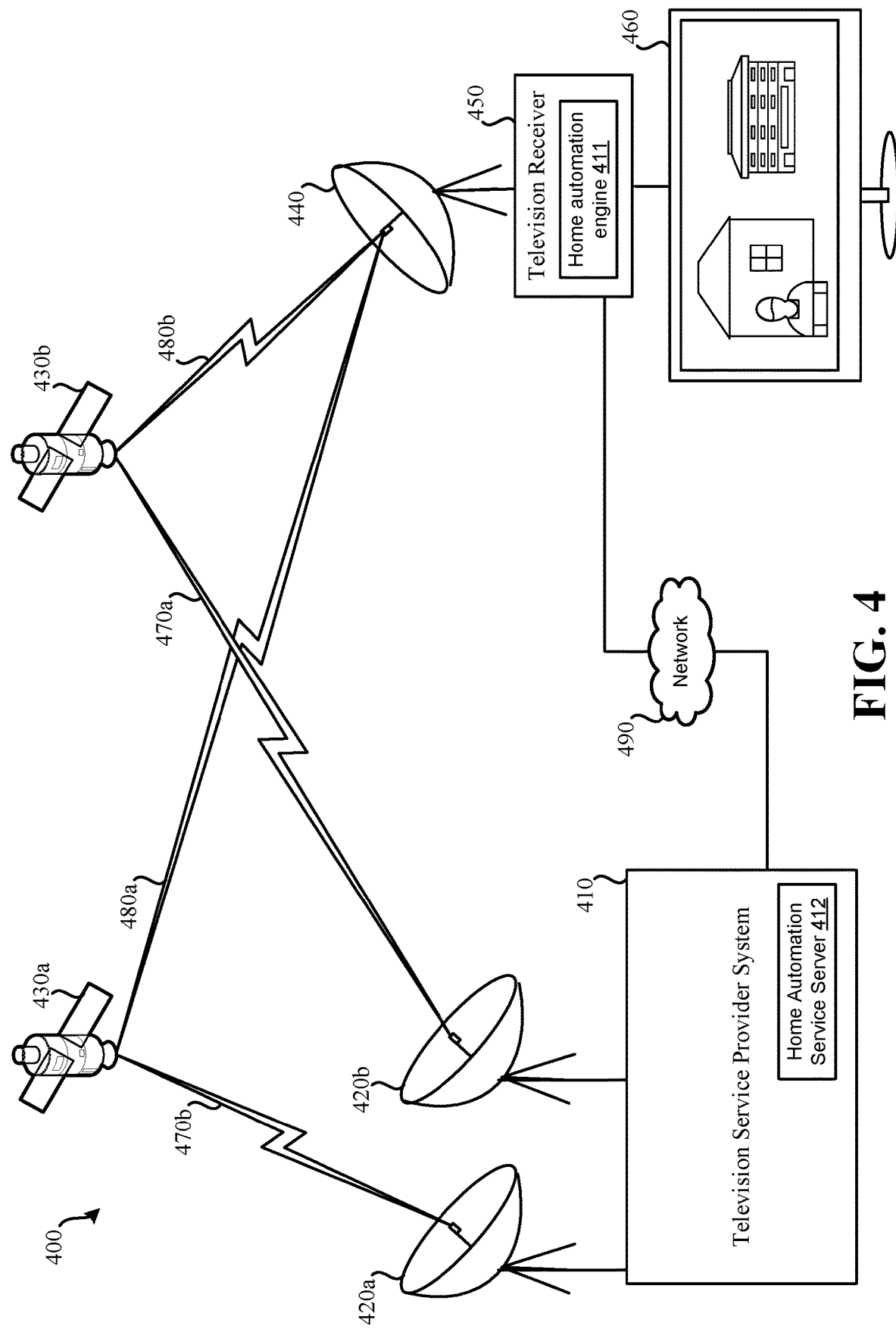
FIG. 4 illustrates an embodiment of a television service provider system.

Television service provider system 145 can be the source of the television service and can be, for example, television service provider system 410 described in FIG. 4. Television service provider system 145 can communicate with host television receiver 105, including transmitting content and other data including software images, authorization messages, and the like. Television service provider system 145 can communicate with host television receiver 105 via any suitable network, including satellite as described in FIG. 4.

The data transmitted from television service provider system 145 can be transmitted to host television receiver 105 and be processed through smart card 130 for decryption and authorizations as described in more detail herein. Data (e.g., the content stream) transmitted to host television receiver 105 can be encrypted with a global network key. The global network key can prevent signal thieves from stealing the content and other data provided to host television receiver 105. The authorized receiving devices (e.g., smart card 130 within host television receiver 105) on the satellite distribution system can know the global network key. Television service provider system 145 can also communicate with client television receiver 160 via smart card 130 as described herein.

Host television receiver 105 may be configured to function as a host for a home automation system either alone or in conjunction with a communication device. Host television receiver 105 may be in the form of a separate device configured to be connected with a display device, such as a television. Embodiments of host television receiver 105 can include a set-top box ("STB"). In addition to being in the form of an STB, host television receiver 105 may be incorporated as part of another device, such as a television, other form of display device, video game console, computer, mobile phone or tablet, or the like. For example, a television may have an integrated television receiver, which does not involve an external STB being coupled with the television.

The host television receiver 105 can include a system on a chip ("SOC") 110, a memory 107, and a smart card 130. The smart card 130 can include a security central processing unit ("CPU") 135 (also referred to herein as security processor 135) and memory 140. The SOC 110 can include display interface 150, processor 152, network interface 155, tuner 195, and trusted hardware area 115. Trusted hardware area 115 can include security CPU (or security processor) 120 and memory 125. Additionally, host television receiver 105 can include one or more of the following, which are not shown: a control processor, a tuning management processor, tuner, a network interface, an electronic programming guide ("EPG") database, a digital video recorder ("DVR") database, an on-demand programming database, a home automation settings database, a home automation script database, a remote control interface, and/or a descrambling engine. In other embodiments of host television receiver 105, fewer or greater numbers of components may be present. It should be understood that the various components of host television receiver 105 may be implemented using hardware, firmware, software, and/or some combination thereof.

Host television receiver 105 can be, for example, television receiver 450 described in FIG. 4. Host television receiver 105 can include a receiving slot into which smart card 130 can be inserted. The receiving slot can include, for example, contact points (not shown) or any other suitable coupling mechanism. Smart card 130 can include contact points (not shown) that line up with the contact points within host television receiver 105 such that when smart card 130 is inserted into host television receiver 105, a communication link between smart card 130 and host television receiver 105 can be created. Any suitable coupling mechanism between smart card 130 and host television receiver 105 can be used, such as a male-to-female socket. Optionally, smart card 130 can be a removable or a non-removable device within host television receiver 105. Optionally, smart card 130 can be, for example, a ball grid array form factor, allowing the smart card 130 to be soldered on the main printed circuit board of the host television receiver 105. While only one host television receiver 105 is depicted in FIG. 1, any number (tens, hundreds, thousands) of authorized receiving devices can receive broadcasts from television service provider system 145 as part of the television service system 100.

Smart card 130 can be any suitable smart card. Smart card 130 can be provided to the television subscriber by, for example, a television service provider. Smart card 130 can be trusted because smart card 130 is designed to handle only security. As such, memory 140 and security CPU 135 are trusted hardware. Further, if security on smart card 130 is compromised, smart card 130 can be replaced without replacing the entire host television receiver 105. Memory 140 can include, for example, instructions that the security CPU 135 can execute to perform various functions specific to smart card 130. For example, memory 140 can include instructions to decrypt data sent from television service provider system 145 using the global network key, which can be stored within memory 140.

Memory 140 can also include instructions for encrypting data with a local key. There are two different types of local keys that can be used to encrypt data before transmission of the data to host television receiver 105 or client television receiver 160. The first local key can be a hardware local key. The hardware local key is a static (i.e., does not change) key that is programmed at chip manufacturing for the SOC 110 or SOC 165. Optionally, the hardware local key can be programmed at STB manufacturing or some other suitable time. SOC 110 and SOC 165 can each have a distinct, unique hardware local key. The hardware local key is known only to the television service provider, the security CPU of the SOC (e.g., SOC 110 or SOC 165), and the smart card 130. Stated differently, the hardware local key for SOC 165 can be known only to trusted hardware including the television service provider trusted hardware, within trusted hardware area 170, and smart card 130. Similarly, the hardware local key for SOC 110 can be known only within trusted hardware of the television service provider, trusted hardware area 115, and smart card 130. Because the local key is known only to the television service provide, the security CPU of the television receiver, and the smart card 130, the security CPU of the television receiver can know when it receives data encrypted with its local key that the data was sent from a trusted source. The second type of local key is a dynamically generated item key. The dynamically generated item key is a key that is generated dynamically by the smart card 130 for encrypting the software image (or other data for transmission) to the host television receiver 105 or client television receiver 160. Memory 140 can include instructions for generating the dynamically generated item key specific to the television receiver to which the data is to be transmitted (e.g., host television receiver 105 or client television receiver 160), encrypting the dynamically generated item key with the hardware local key for the television receiver to which the data is to be transmitted (e.g., host television receiver 105 or client television receiver 160), and transmitting the software image or other data (encrypted with the dynamically generated item key) as well as the dynamically generated item key (encrypted with the hardware local key) to the appropriate security CPU (e.g., security CPU 120 or security CPU 175). Memory 140 can also include instructions for generating the dynamically generated item key such that the dynamically generated item key is unique for each session (e.g., each new software image or set of packets associated with a single data item). Stated differently, each session can utilize a new dynamically generated item key generated specifically for that item of data and for host television receiver 105 or client television receiver 160.

Memory 140 can also include information that specifies the content allowed or intended for host television receiver 105 and client television receiver 160. Further, memory 140 can include a unique identifier for smart card 130, which can be used for authorization and pairing smart card 130 to host television receiver 105 and to client television receiver 160 as described in more detail below. Memory 140 can be any size memory. Memory on a smart card, however, is typically limited due to physical size constraints. Security CPU 135 can be any suitable processor configured to execute only trusted instructions stored on memory 140. Optionally, though depicted as having a single memory 140 and security CPU 135, smart card 130 can have more than one memory and more than one processor. Further, the additional processors on smart card 130 can include security processors and/or can include any other suitable processors.

Memory 107 can include instructions for execution by, for example, processor 152. Memory 107 can include the operating system of host television receiver 105, for example. Memory 107 can be, for example, working memory 535 of FIG. 5. Memory 107 can be, for example, a flash drive, random access memory ("RAM"), read only memory ("ROM"), or any other suitable memory device. Further, while depicted as having a single memory 107, host television receiver 105 can include more than one memory device.

SOC 110 can include display interface 150, processor 152, network interface 155, tuner 195, and trusted hardware area 115. Trusted hardware area 115 can include memory 125 and security CPU 120. Security CPU 120 can be any suitable processor configured to execute only trusted instructions stored within memory 125. Memory 125 can include, for example, instructions that security CPU 120 can execute to perform various functions specific to host television receiver 105. For example, memory 125 can include instructions to decrypt data sent from smart card 130. Memory 125 can also store the hardware local key needed to decrypt data intended for host television receiver 105. As discussed above, the local key can be programmed into memory 125 during manufacturing of SOC 110. Additionally, SOC 110 can have a unique identifier, which can be stored in memory 125. Memory 125 can be any size memory.

Display interface 150 can serve to output a signal to a television or another form of display device in a proper format for display of video and playback of audio. As such, display interface 150 can output one or more television channels, stored television programming (e.g., television programs from a DVR database or television programs from on-demand programming and/or information from an EPG database), to a television for presentation. SOC 110 can include network interface 155, which can be any suitable network interface for communicating on a network at least between host television receiver 105 and client television receiver 160. SOC 110 can further include other components not shown and described above to control home automation, DVR functionality, and the like.

Processor 152 can be any suitable processor used to process instructions stored in, for example, memory 107. Processor 152 can be one or more general-purpose processors and/or one or more special-purpose processors such as digital signal processing chips, graphics acceleration processors, and/or the like. Processor 152 can be, for example, processor 510 of FIG. 5. Optionally, while depicted as having a single processor 152, host television receiver 105 can include more than one processor.

Tuner 195 may include one or more tuners used to tune to transponders that include broadcasts of one or more television channels or transmission of other data, such as software images. Such tuners may be used also to receive storage on-demand content and/or addressable television commercials. In some embodiments, two, three, or more than three tuners may be present, such as four, six, or eight tuners. Each tuner contained in tuner 195 may be capable of receiving and processing a single transponder stream from a satellite transponder or from a cable network at a given time. As such, a single tuner may tune to a single transponder stream at a given time. If tuner 195 includes multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuner 195 may be used to receive the signal containing the multiple television channels for presentation and/or recording. Tuner 195 may receive commands from a tuning management processor (not shown), which can instruct tuner 195 to which frequencies are to be tuned.

Client television receiver 160 can include memory 162 and SOC 165. SOC 165 can include network interface 185, display interface 190, processor 192, and trusted hardware area 170. Trusted hardware area 170 can include security CPU (or security processor) 175 and memory 180. Note that client television receiver 160 does not have a smart card. Client television receiver can communicate with host television receiver through network interfaces 185 and 155. The network that the network interfaces 185 and 155 communicate through can be a trusted or untrusted network. The network interfaces 185 and 155 can be wired or wireless interfaces allowing communication via Bluetooth®, Wi-Fi, TCP/IP, or any other suitable communication protocol.

Client television receiver 160 may be in the form of a separate device configured to be connected with a display device, such as a television. Embodiments of client television receiver 160 can include set-top boxes ("STBs"). In addition to being in the form of an STB, client television receiver 160 may be incorporated as part of another device, such as a television, other form of display device, video game console, computer, mobile phone or tablet, or the like. For example, a television may have an integrated television receiver, which does not involve an external STB being coupled with the television.

Client television receiver 160 can be any client television receiver with capability to receive and process content and data as described herein but which does not have a smart card physically coupled. Client television receiver 160 can include SOC 165. SOC 165 can include network interface 185, which can be any suitable network interface for communicating on a network at least with host television receiver 105.

Display interface 190 can serve to output a signal to a television or another form of display device in a proper format for display of video and playback of audio. As such, display interface 190 can output one or more television channels, stored television programming (e.g., television programs from a DVR database or television programs from on-demand programming and/or information from an EPG database), to a television for presentation.

Processor 192 can be any suitable processor used to process instructions stored in, for example, memory 162. Processor 192 can be one or more general-purpose processors and/or one or more special-purpose processors such as digital signal processing chips, graphics acceleration processors, and/or the like. Processor 192 can be, for example, processor 510 of FIG. 5. Optionally, while depicted as having one processor 192, client television receiver 160 can include more than one processor.

Trusted hardware area 170 can include security CPU 175 and memory 180. Security CPU 175 can be any suitable CPU configured to execute only trusted instructions stored on memory 180. Optionally, while depicted as a single security CPU 175, trusted hardware area 170 can include more than one security CPU. Memory 180 can include, for example, instructions that security CPU 175 can execute to perform various functions specific to client television receiver 160. For example, memory 180 can include instructions to decrypt data sent from smart card 130. Memory 180 can also store the hardware local key needed to decrypt data intended for client television receiver 160. As discussed above, the hardware local key can be programmed into memory 180 during manufacturing of SOC 165. Additionally, SOC 165 can have a unique identifier, which can be stored in memory 180. Memory 180 can be any size memory. Optionally, while depicted as having a single memory 180, trusted hardware area 170 can include more than one memory.

Memory 162 can include instructions for execution by, for example, processor 192. Memory 162 can include the operating system of client television receiver 160, for example. Memory 162 can be, for example, working memory 535 of FIG. 5. Optionally, while depicted as having a single memory 162, client television receiver 160 can include more than one memory.

In use, data transmitted to host television receiver 105 from television service provider system 145 can be encrypted with a global network key. This global network key system can prevent signal thieves from stealing content and other data provided to host television receiver 105. For signature verification purposes, the smart card 130 within host television receiver 105 on the television service system 100 can know the global public signature key to verify signatures, but does not have the global private signature key, so not even a compromised smart card can sign data for other devices since it does not have the global private signature key. As described in more detail herein, a local key can be used by the authorized decrypting devices (e.g., smart card 130) to maintain a high level of security with the television receivers (e.g., host television receiver 105 and client television receiver 160), ensuring that the content and other data transmitted to television receivers remains secure and can only be decrypted by the specific television receiver (e.g., host television receiver 105 or client television receiver 160) to which it was transmitted. It is impractical, however, to encrypt each transmission separately for each television receiver and, therefore, a global network key is practical at the television service provider transmission level.

Prior to distributing content or other information to the host television receiver 105 or client television receiver 160, smart card 130 can pair (also called marrying) with client television receiver 160 and host television receiver 105. To pair, the unique identifier of the SOC (e.g., 110 or 165) and the unique identifier of the smart card 130 can be transmitted to the television service provider system with a request for authentication. Optionally, the authentication can be initiated from the television service provider system 145. If the television receiver (client television receiver 160 or host television receiver 105) is authorized for the television subscriber having smart card 130 (e.g., television subscriber has paid for/is authorized to have a client television receiver 160 or host television receiver 105) the television service provider system 145 can transmit an authentication message.

The authentication message can include an authentication code and the local key for SOC 110 if the request to pair was for the host television receiver 105. If the request to pair was for the client television receiver 160, the authentication message can include an authentication code and the local key for SOC 165. Once smart card 130 has the SOC 110 local key, smart card 130 can encrypt data specifically for host television receiver 105 that cannot be decrypted by any other television receiver, including client television receiver 160. Similarly, once smart card 130 has the SOC 165 local key, smart card 130 can encrypt data specifically for client television receiver 160 that cannot be decrypted by any other television receiver, including host television receiver 105.

After pairing, to display content on a display device from client television receiver 160, the television service provider system 145 may transmit a content stream encrypted with a global network key via host television receiver 105 to smart card 130. Smart card 130 can decrypt the content stream with the global network key. Smart card 130 can determine that client television receiver 160 is the destination for the content stream. Security CPU 135 can generate a dynamically generated item key for the session. The dynamically generated item key can be specific to this content stream and the client television receiver. Security CPU 135 can encrypt the dynamically generated item key with the local key for SOC 165 and transmit the encrypted dynamically generated item key to the client television receiver 160. Smart card 130 can encrypt the content stream with the dynamically generated item key and transmit the encrypted content stream to the client television receiver 160 via network interface 155 to network interface.

Once client television receiver 160 receives the encrypted dynamically generated item key, security CPU 175 can decrypt the dynamically generated item key with its local key. Security CPU 175 can make the decrypted dynamically generated item key available to the client television receiver for decrypting the content stream. For example, security CPU 175 can place the decrypted dynamically generated item key in a non-readable register that can be accessed by a cryptographic hardware accelerator, which can be used to decrypt the content stream. As client television receiver 160 receives the encrypted content stream, client television receiver 160 can decrypt the content stream with the dynamically generated item key. After security CPU 175 decrypts the content stream, it can transmit the content stream to display interface 190 for display on a display device for the television subscriber.

Note that while content streamed through smart card 130 to client television receiver 160 may go through areas of host television receiver 105 that are not as trusted as smart card 130 and trusted hardware area 170 as well as a network between network interface 155 and 185 that may not be trusted, the security of the content is ensured. The encryption of the content stream with the dynamically generated item key ensures that the data remains private. Without the dynamically generated item key, which only the security CPUs 135 and 175 have, the data cannot be decrypted. In other words, the content stream cannot be stolen by signal thieves. Because security CPU 175 is within trusted hardware area 170, the enforcement of the security of the transmitted content is ensured by the trusted hardware. Because hardware enforcement of security is an order of magnitude more secure than software enforcement of security, the system is substantially less vulnerable to hacking than a system in which security were enforced with software and processors that are not in a trusted hardware portion of the client television receiver 160.

Figure 2A:
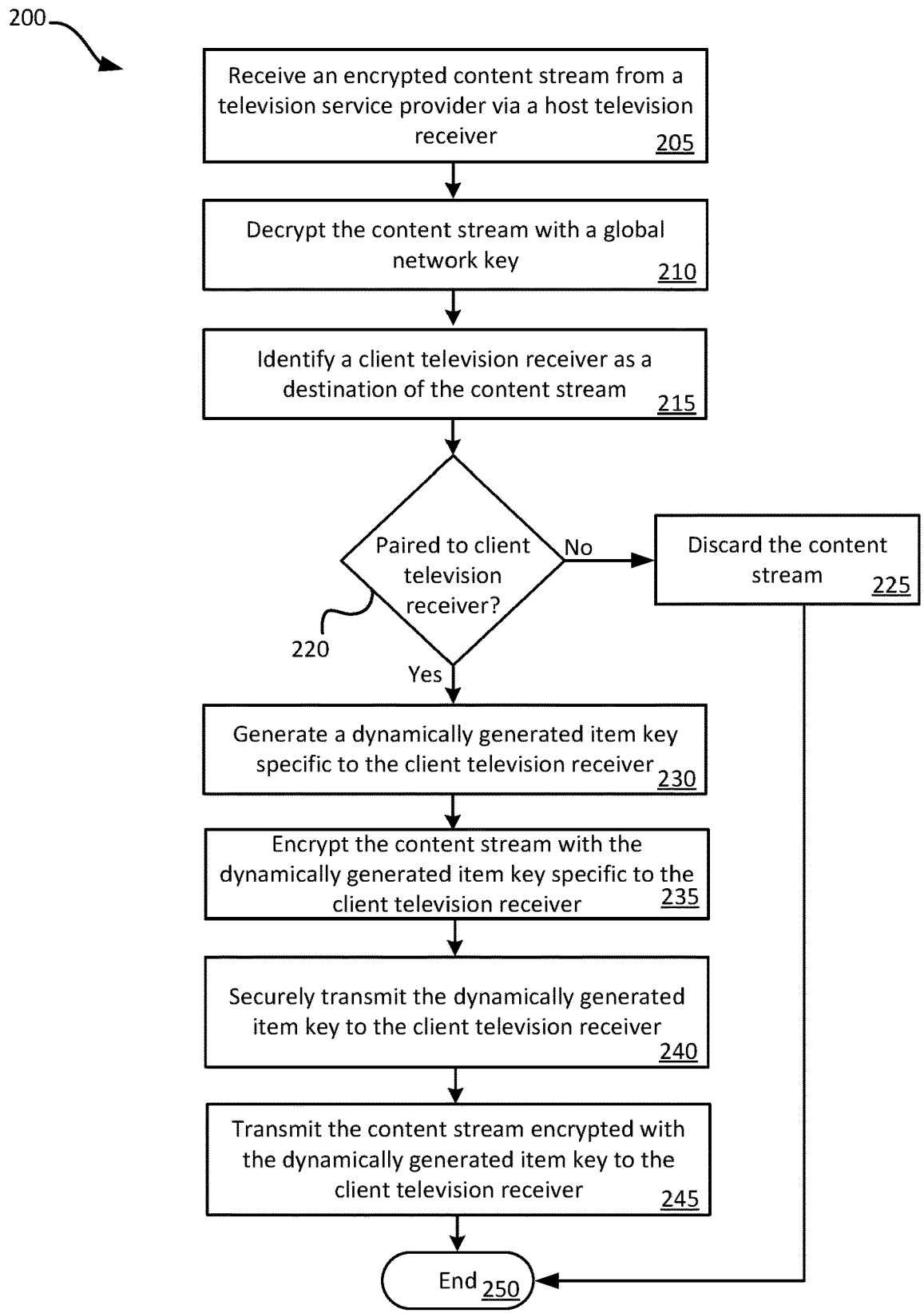
FIGS. 2A and 2B illustrate methods for securing content to a client television receiver.

FIG. 2A illustrates a method 200 for providing secured content to a client television receiver. Method 200 can be performed by, for example, smart card 130 of FIG. 1. At 205, the smart card can receive an encrypted content stream from a television service provider via a host television receiver. The content stream can be encrypted with a global network key known to all authorized receiving devices (e.g., smart card 130) on the television service provider network.

At 210, the smart card can decrypt the content stream with the global network key. Once decrypted, the smart card can, at 215, determine that the content stream destination is a client television receiver (e.g., client television receiver 160). Note that the client television receiver does not contain a smart card. Further note that the smart card that receives the content stream is inserted into a host television receiver.

At 220, the smart card can determine whether the destination client television receiver is paired to the smart card. For example, if the smart card does not have stored in memory the local key for the client television receiver, the smart card can know it is not paired with the client television receiver. Note that optionally, the smart card can be paired with more than one client television receiver. Optionally, if the client television receiver is not paired with the smart card, the smart card can initiate a pairing operation to attempt to pair the client television receiver with the smart card upon receiving content intended for the client television receiver. Optionally, the smart card can discard the content stream at 225 without transmitting the content stream to the client television receiver if the client television receiver is not paired with the smart card. If the client television receiver is not paired with the smart card, method 200 can end at 250.

At 230, if the smart card is paired with the client television receiver, the smart card can generate a dynamically generated item key specifically for the client television receiver. The dynamically generated item key can be a key generated by the smart card for use with the content stream. A new dynamically generated item key can be generated for use with each session (e.g., each content stream). Stated differently, the dynamically generated item key can be a unique local key for the session and the television receiver. Using a unique local key for each session can further thwart signal thieves.

At 235, the smart card can use the dynamically generated item key to encrypt the content stream. Optionally, the smart card can encrypt the dynamically generated item key with the client television receiver's hardware local key. A different local key specific to the client television receiver can optionally be used to encrypt the dynamically generated item key.

At 240, the smart card can transmit the encrypted dynamically generated item key to the client television receiver. At 245, the smart card can transmit the encrypted content stream to the client television receiver. As discussed with respect to FIG. 1, the smart card can transmit the content stream over an untrusted network through a network interface in the host television receiver that houses the smart card. As noted above, the smart card need not trust the host television receiver to transmit the content to the client television receiver. Optionally, the smart card can transmit the content stream using a network interface of the smart card. For example, the smart card can include a wireless network interface such as, for example, Bluetooth® or Wi-Fi. The smart card can use that wireless network interface to transmit the content stream to the client television receiver. The client television receiver can include a network interface that can be used to receive the content stream. The method 200 can end at 250.

Figure 2B:
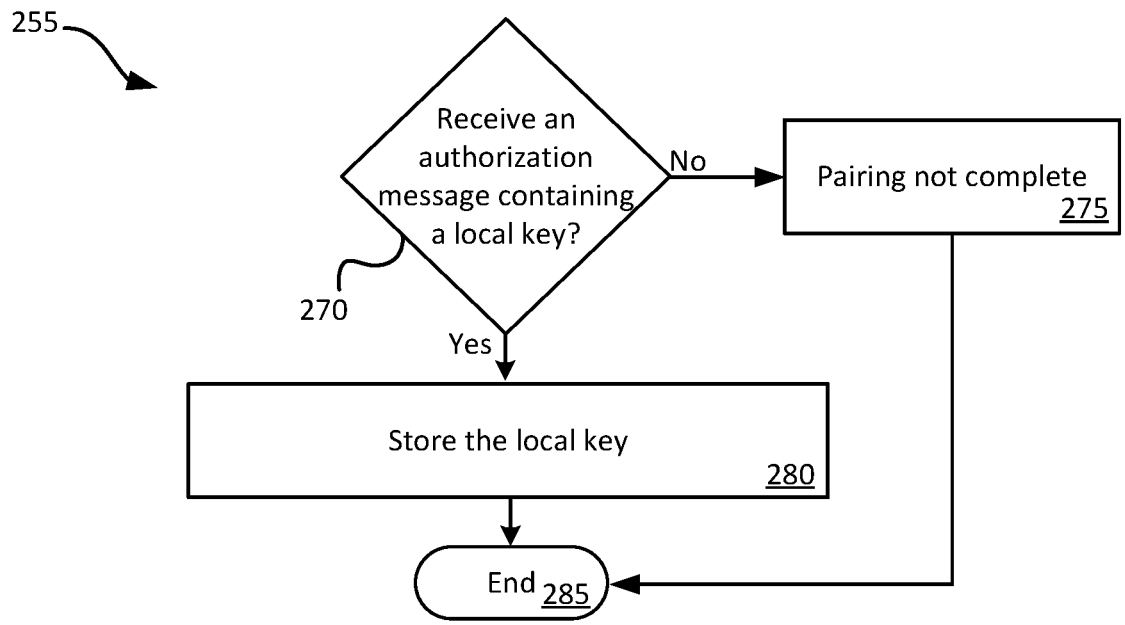

FIG. 2B illustrates a method 255 for pairing a smart card to a client television receiver. Method 255 can be performed by a smart card, such as smart card 130 of FIG. 1. The smart card can optionally use method 255 to pair with a host television receiver as well. Further, the smart card can optionally use method 255 to pair with multiple client television receivers. The client television receiver can have a unique public name. The unique public name can be the unique identifier of the SOC within the client television receiver as discussed above with respect to FIG. 1. This pairing method 255 can be initiated by, for example, a user interface on a display device connected to a host television receiver to which the smart card is coupled. For example, the television subscriber can utilize a user interface to request pairing. As another option, the method 255 can be initiated by, for example, a user interface on a display device connected to the client television receiver. For example, the television subscriber can utilize a user interface to request pairing. As another option, upon boot-up of the client television receiver, the method 255 can automatically begin with the client television receiver transmitting (e.g., broadcasting) its unique public name, which can be received by the smart card. As another option, the pairing operation can be automatically attempted if the smart card receives a transmission intended for the client television receiver but is not paired with the client television receiver. For example, at 220 of FIG. 2A. As another option, upon purchase of a client television receiver, a call center representative can add the client television receiver to the customer's account, which can trigger an authorization message to be sent to the customer's smart card.

Optionally, the smart card can request an authorization message from the television service provider for the client television receiver. The television service provider can know that the television subscriber has (or does not have) authorization to pair the client television receiver to the smart card. The television service provider can use the smart card to control access by the television subscriber to content and access on multiple televisions through multiple client television receivers. The request can include the unique public name (e.g., unique identifier of SOC 165) of the client television receiver as well as the unique identifier of the smart card as discussed above with respect to smart card 130 of FIG. 1.

At 270, the smart card can determine whether it received an authorization message from the television service provider with a proper authorization code and/or a local key specific to the client television receiver (e.g., the hardware local key of SOC 165 as discussed above with respect to FIG. 1). Optionally, if the television service provider deems that the client television receiver is not authorized, the television service provider may not send an authorization message. The smart card can, for example, timeout the request after a threshold period of time with no response from the television service provider. In such case, the pairing can be deemed incomplete at 275 and the method 255 can end at 285.

Optionally, the television service provider can transmit an authorization message to the smart card that may not contain the proper authorization code. For example, the authorization code may not be appropriate for that smart card because the client television receiver may not be authorized to pair with that smart card. In such case that the smart card does not receive a proper authorization code, the smart card can deem the pairing incomplete at 275 and the method can end at 285.

If the smart card received an authorization message with a proper authorization code and/or a local key unique to the client television receiver, at 280 the smart card can store the local key specific to the client television receiver. The smart card and the client television receiver are considered paired or married if the smart card has a unique local key specific to the client television receiver stored in memory. At 285, method 255 can end.

Optionally, this method 255 can be performed in conjunction with method 200, either prior to method 200 or at 220. Optionally, if there is current content or data to be transmitted to the client television receiver, the smart card can, at 280, encrypt the data or content with the local key specific to the client television receiver and transmit the data to the client television receiver once the pairing is complete.

Figure 3:
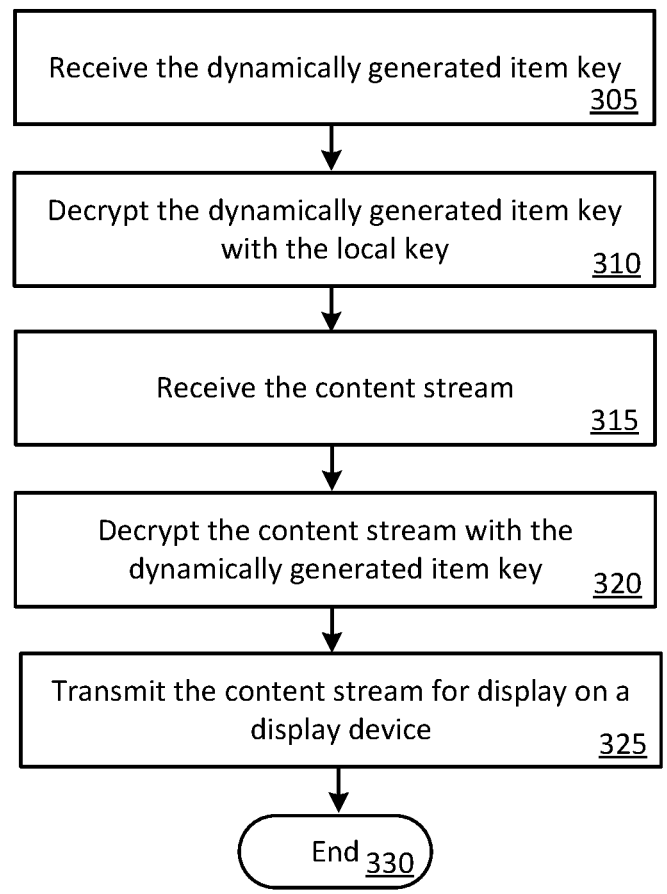
FIG. 3 illustrates another method for securing content to a client television receiver.

FIG. 3 illustrates a method 300 for providing secure content to a client television receiver. Method 300 can be performed by a client television receiver (e.g., client television receiver 160 of FIG. 1). Method 300 can begin where method 200 left off with the smart card transmitting an encrypted content stream to the client television receiver. At 305, the client television receiver can receive the encrypted dynamically generated item key. The dynamically generated item key can be specific to the client television receiver, as described above. Further, the dynamically generated item key can be encrypted with a key that is specific to the client television receiver.

At 310, the client television receiver can use its local key to decrypt the dynamically generated item key. The local key can be the hardware local key programmed during manufacturing. As discussed above, only the smart card paired with the client television receiver can have a copy of the client television receiver's local key used to encrypt the dynamically generated item key. The local key can be kept secure in trusted hardware on both the smart card and the client television receiver.

At 315 the client television receiver can receive the content stream. At 320, the client television receiver can decrypt the content stream with the dynamically generated item key.

Upon successful decryption of the content stream, the client television receiver can, at 325, transmit the content stream to a display device for display. At 330 the method 300 can end. Note that the use of the trusted hardware areas of the client television receiver and the smart card as well as the dynamically generated item key and local key specific to the client television receiver ensure that the content stream is securely received only with proper authorization to the client television receiver for use by the television subscriber. Further note that without pairing of the client television receiver and the smart card, this secure authorization and transmission/reception could not occur.

FIG. 4 illustrates an embodiment of a satellite television distribution system 400. While a home automation system may be incorporated with various types of television receivers, various embodiments may be part of a satellite-based television distribution system. Cable, IP-based, wireless, and broadcast focused systems are also possible. Satellite television distribution system 400 may include: television service provider system 410, satellite transmitter equipment 420, satellites 430, satellite dish 440, television receiver 450, home automation service server 412, and display device 460. The display device 460 can be controlled by, for example, a user using a remote control device that can send wired or wireless signals to communicate with the television receiver 450 and/or display device 460. Alternate embodiments of satellite television distribution system 400 may include fewer or greater numbers of components. While only one satellite dish 440, television receiver 450, and display device 460 (collectively referred to as "user equipment") are illustrated, it should be understood that multiple (e.g., tens, thousands, millions of) instances and types of user equipment may receive data and television signals from television service provider system 410 via satellites 430.

Television service provider system 410 and satellite transmitter equipment 420 may be operated by a television service provider. A television service provider may distribute television channels, on-demand programming, programming information, and/or other content/services to users. Television service provider may also distribute software updates for television receiver 450. Television service provider system 410 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 420 may be used to transmit a feed of one or more television channels from television service provider system 410 to one or more satellites 430. While a single television service provider system 410 and satellite transmitter equipment 420 are illustrated as part of satellite television distribution system 400, it should be understood that multiple instances of transmitter equipment may be used, possibly scattered geographically, to communicate with satellites 430. Such multiple instances of satellite transmitting equipment may communicate with the same or with different satellites. Different television channels may be transmitted to satellites 430 from different instances of transmitting equipment. For instance, a different satellite dish of satellite transmitter equipment 420 may be used for communication with satellites in different orbital slots.

Satellites 430 may be configured to receive signals, such as streams of television channels or other data including software images for updating various television receivers, from one or more satellite uplinks such as satellite transmitter equipment 420. Satellites 430 may relay received signals from satellite transmitter equipment 420 (and/or other satellite transmitter equipment) to multiple instances of user equipment via transponder streams. Different frequencies may be used for uplink signals 470 from downlink signals 480. Satellites 430 may be in geosynchronous orbit. Each of the transponder streams transmitted by satellites 430 may contain multiple television channels transmitted as packetized data. For example, a single transponder stream may be a serial digital packet stream containing multiple television channels. Therefore, packets for multiple television channels may be interspersed. Further, information used by television receiver 450 for home automation functions may also be relayed to a television receiver via one or more transponder streams. Further still, software images used to update television receiver 450 can be relayed to television receiver 450 via one or more transponder streams.

Multiple satellites 430 may be used to relay television channels or any other data such as information used for home automation or software images used to update television receiver 450 from television service provider system 410 to satellite dish 440. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 430*a*. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 440 may be a piece of user equipment that is used to receive transponder streams from one or more satellites, such as satellites 430. Satellite dish 440 may be provided to a subscriber for use on a subscription basis to receive television channels provided by the television service provider system 410, satellite transmitter equipment 420, and/or satellites 430. Satellite dish 440, which may include one or more low noise blocks ("LNBs"), may be configured to receive transponder streams from multiple satellites and/or multiple transponders of the same satellite. Satellite dish 440 may be configured to receive television channels via transponder streams on multiple frequencies. Based on the characteristics of television receiver 450 and/or satellite dish 440, it may only be possible to capture transponder streams from a limited number of transponders concurrently. For example, a tuner of television receiver 450 may only be able to tune to a single transponder stream from a transponder of a single satellite at a given time. The tuner can then be re-tuned to another transponder of the same or a different satellite. A television receiver 450 having multiple tuners may allow for multiple transponder streams to be received at the same time.

In communication with satellite dish 440 may be one or more television receivers. Television receivers may be configured to decode signals received from satellites 430 via satellite dish 440 for output and presentation via a display device, such as display device 460. A television receiver may be incorporated as part of a television or may be part of a separate device, commonly referred to as a set-top box ("STB"). Television receiver 450 may decode signals received via satellite dish 440 and provide an output to display device 460. On-demand content, such as pay-per-view ("PPV") content, may be stored to a computer-readable storage medium. FIG. 1 provides additional detail of various embodiments of a television receiver. A television receiver is defined to include STBs, and also circuitry having similar functionality that may be incorporated with another device. For instance, circuitry similar to that of a television receiver may be incorporated as part of a television. As such, while FIG. 4 illustrates an embodiment of television receiver 450 as separate from display device 460, it should be understood that, in other embodiments, similar functions may be performed by a television receiver integrated with display device 460. Television receiver 450 may include home automation engine 411.

Display device 460 may be used to present video and/or audio decoded and output by television receiver 450. Television receiver 450 may also output a display of one or more interfaces to display device 460, such as an electronic programming guide ("EPG"). In many embodiments, display device 460 is a television. Display device 460 may also be a monitor, computer, or some other device configured to display video and, possibly, play audio.

Uplink signal 470a represents a signal between satellite transmitter equipment 420 and satellite 430a. Uplink signal 470b represents a signal between satellite transmitter equipment 420 and satellite 430b. Each of uplink signals 470 may contain streams of one or more different television channels. For example, uplink signal 470a may contain a first group of television channels, while uplink signal 470b contains a second group of television channels. Each of these television channels may be scrambled such that unauthorized persons are prevented from accessing the television channels. Uplink signals 470 can also contain other data as described herein, such as software images for updating television receiver 450.

Downlink signal 480a represents a signal between satellite 430a and satellite dish 440. Downlink signal 480b represents a signal between satellite 430b and satellite dish 440. Each of downlink signals 480 may contain one or more different television channels, which may be at least partially scrambled. A downlink signal may be in the form of a transponder stream. A single transponder stream may be tuned to at a given time by a tuner of a television receiver. For example, downlink signal 480a may be a first transponder stream containing a first group of television channels, while downlink signal 480b may be a second transponder stream containing a different group of television channels. In addition to or instead of containing television channels, a transponder stream can be used to transmit on-demand content to television receivers, including PPV content, which may be stored locally by the television receiver until output for presentation. Further, a transponder stream can contain other data as described herein, such as software images for updating television receiver 450.

FIG. 4 illustrates downlink signal 480a and downlink signal 480b, being received by satellite dish 440 and distributed to television receiver 450. For a first group of television channels, satellite dish 440 may receive downlink signal 480a and for a second group of channels, downlink signal 480b may be received. Television receiver 450 may decode the received transponder streams. As such, depending on which television channels are desired to be presented or stored, various transponder streams from various satellites may be received, descrambled, and decoded by television receiver 450. Further, television receiver 450 can control content as described in more detail in FIG. 1.

Network 490, which may include the Internet, may allow for bidirectional communication between television receiver 450 and television service provider system 410, such as for home automation related services provided by home automation service server 412. Although illustrated as part of the television service provider system, the home automation service server 412 may be provided by a third party in embodiments. In addition or in alternate to network 490, a telephone, e.g., landline, or cellular connection may be used to enable communication between television receiver 450 and television service provider system 410.

Figure 5:
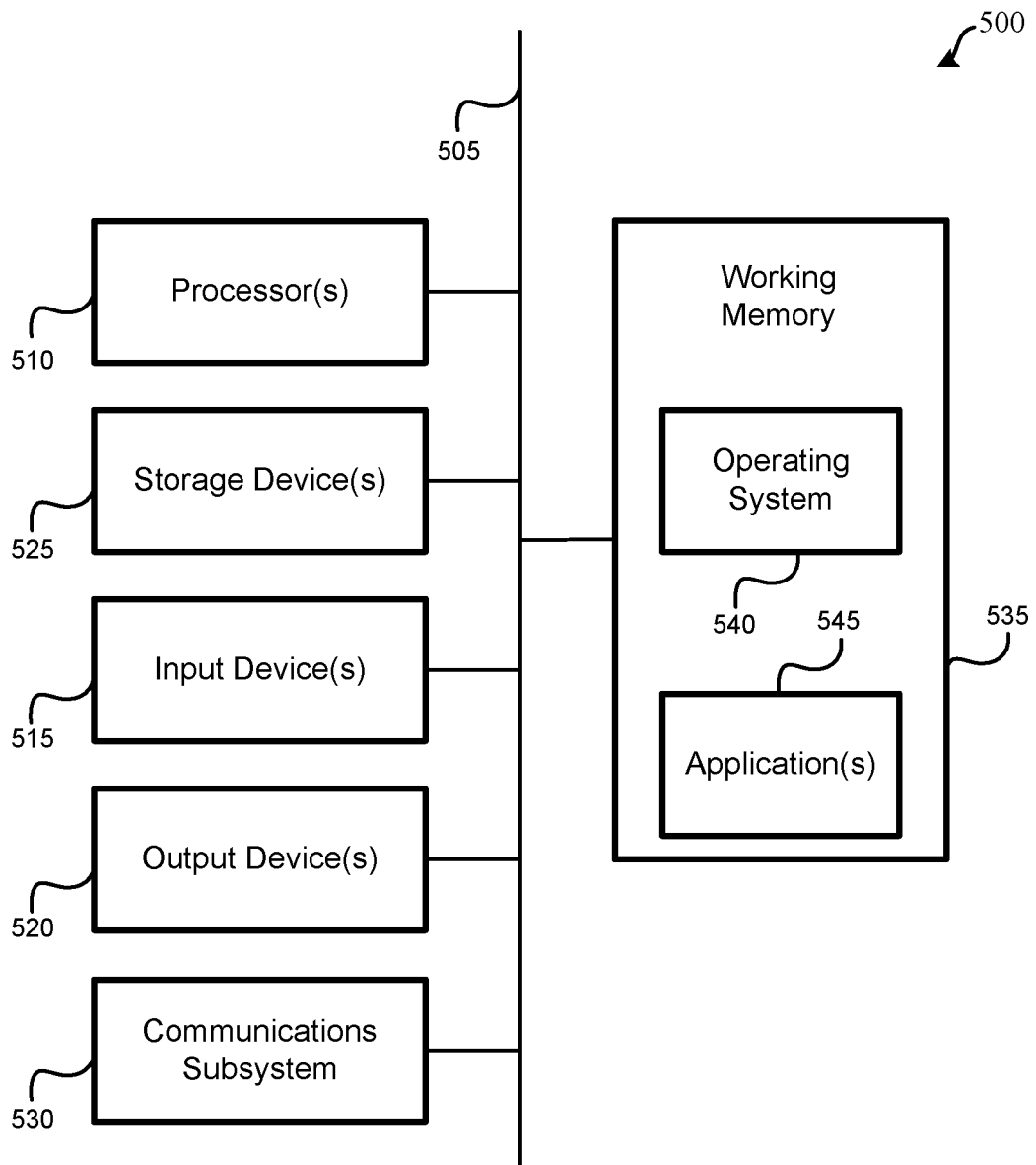
FIG. 5 illustrates an embodiment of a computer system.

FIG. 5 illustrates an embodiment of a computer system 500. A computer system 500 as illustrated in FIG. 5 may be incorporated into devices such as a television receiver (e.g., host television receiver 105 of FIG. 1), DVR, television, media system, personal computer, and the like. FIG. 5 provides a schematic illustration of one embodiment of a computer system 500 that can perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510 (e.g., processor 152 and processor 192 of FIG. 1) and/or one or more special purpose processors (e.g., security CPU 175 and security CPU 120 of FIG. 1), including without limitation one or more general-purpose processors and/or one or more special-purpose processors such as digital signal processing chips, graphics acceleration processors, and/or the like; one or more input devices 515, which can include without limitation a mouse, a keyboard, a camera, a remote control, and/or the like; and one or more output devices 520, which can include without limitation a display device, a printer, and/or the like.

The computer system 500 may further include and/or be in communication with one or more non-transitory storage devices 525 (e.g., memory 107 and/or memory 162 of FIG. 1), which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, may be incorporated into the computer system 500 (e.g., an electronic device or STB), as an input device 515. In many embodiments, the computer system 500 will further comprise a working memory 535, which can include a RAM or ROM device, as described above. Memory 162 and memory 107 of FIG. 1 can include a working memory.

The computer system 500 also can include software elements, shown as being currently located within the working memory 535, including an operating system 540, device drivers, executable libraries, and/or other code, such as one or more application programs 545, which may comprise computer programs provided by various embodiments, and/ or may be designed to implement methods, and/or configure systems, provided by other embodiments, as described herein. Merely by way of example, one or more procedures described with respect to the methods discussed above, such as those described in relation to FIG. 2A, 2B, or 3, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received from the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A system comprising:
a client television receiver comprising:
a display interface to communicatively couple with a display device;
a host interface to communicatively couple with a host television receiver having a smart card paired therewith, the smart card configured to generate a re-encrypted content stream by decrypting an encrypted content stream from a television service provider using a secure local instance of a global network key and re-encrypting the decrypted content stream using a dynamically generated item key generated specifically for the client television receiver by the smart card, and the smart card configured to generate an encrypted dynamically generated item key by encrypting the dynamically generated item key using a first secure local instance of a local key received in accordance with receiving authorization from the television service provider to pair the smart card with the client television receiver;
a security processor having a second secure local instance of the local key, the security processor to recover the dynamically generated item key by decrypting the encrypted dynamically generated item key with the second secure local instance of the local key; and
a client processor to recover the decrypted content stream by obtaining the dynamically generated item key from the security processor and decrypting the re-encrypted content stream by applying the recovered dynamically generated item key, and to transmit the decrypted content stream to the display device via the display interface.

2. The system of claim 1, wherein:
the local key is previously associated with the client television receiver by the television service provider; and
the encrypted content stream is received by the host television receiver from the television service provider.

3. The system of claim 1, further comprising:
a security memory coupled with the security processor, the security memory having the local key securely stored thereon, and having stored thereon security instructions that, when executed by the security processor, cause the security processor to receive the encrypted dynamically generated item key from the host television receiver via the host interface and to decrypt the dynamically generated item key with the local key.

4. The system of claim 1, further comprising:
a client memory coupled with the client processor, the client memory having stored thereon client instructions that, when executed by the client processor, cause the client processor to receive the encrypted content stream from the host television receiver via the host interface and to decrypt the encrypted content stream using the dynamically generated item key.

5. The system of claim 1, further comprising:
the host television receiver comprising:
a network interface by which to receive a plurality of encrypted content streams, including the encrypted content stream, from the television service provider via a television network; and
a smart card interface having the smart card paired therewith.

6. The system of claim 5, wherein:
the smart card is further to determine, responsive to receiving the encrypted content stream, that the encrypted content stream is destined for the client television receiver; and
the smart card is to generate the dynamically generated item key specific to the client television receiver in response to the determining that the encrypted content stream is destined for the client television receiver.

7. The system of claim 1, further comprising:
a plurality of client television receivers, the client television receiver being one of the plurality of client television receivers, each of the plurality of client television receivers to communicatively couple with the host television receiver,
wherein the smart card is configured to pair with only a subset of the plurality of client television receivers.

8. The system of claim 5, wherein the smart card is further to:
receive a second encrypted content stream from the television service provider via the host television receiver, the second encrypted content stream destined for the host television receiver;
decrypt the second encrypted content stream to generate a decrypted second content stream;
generate a second dynamically generated item key specific to the host television receiver;
encrypt the decrypted second content stream with the second dynamically generated item key to generate a re-encrypted second content stream; and
transmit the second dynamically generated item key and the re-encrypted second content stream to the host television receiver.

9. A method comprising:
receiving, by a client television receiver from a host television receiver, an encrypted dynamically generated item key corresponding to a dynamically generated item key that was generated specific to the client television receiver by a smart card paired with the host television receiver and encrypted by the smart card to generate the encrypted dynamically generated item key using a local key securely stored at both the host television receiver and the client television receiver, the local key received by the smart card in accordance with receiving authorization from a television service provider to pair the smart card with the client television receiver;

decrypting, by the client television receiver, the encrypted dynamically generated item key with the local key to recover the dynamically generated item key;

receiving, by the client television receiver from the host television receiver, a re-encrypted content stream that was encrypted by the smart card of the host television receiver by decrypting an encrypted content stream received from the television service provider using a global network key and re-encrypting the decrypted content stream using the dynamically generated item key;

decrypting, by the client television receiver, the re-encrypted content stream using the recovered dynamically generated item key to recover a corresponding content stream; and transmitting the decrypted content stream to a display device via a display interface.

10. The method of claim 9, wherein:

the local key is previously associated with the client television receiver by the television service provider; and the encrypted content stream was received by the host television receiver from the television service provider prior to being transmitted from the host television receiver to the client television receiver.

11. The method of claim 9, wherein:

the receiving the encrypted dynamically generated item key and the decrypting the encrypted dynamically generated item key are performed by a security processor of the client television receiver;

the receiving the re-encrypted content stream and the decrypting the re-encrypted content stream are performed by a client processor of the client television receiver; and the security processor is separate from the client processor.

12. The method of claim 9, further comprising:

receiving, by the host television receiver, the encrypted content stream from the television service provider via a television network;

decrypting, by the smart card, the encrypted content stream using the global network key to generate the decrypted content stream;

generating, by the smart card, the dynamically generated item key specific to the client television receiver;

encrypting the decrypted content stream with the dynamically generated item key to generate the re-encrypted content stream;

encrypting the dynamically generated item key using the local key to generate the encrypted dynamically generated item key; and transmitting the encrypted dynamically generated item key and the re-encrypted content stream to the client television receiver.

13. The method of claim 12, further comprising:

determining, by the smart card, that the encrypted content stream is destined for the client television receiver, wherein the generating is in response to the determining that the encrypted content stream is destined for the client television receiver.

14. The method of claim 12, further comprising:

receiving, by the smart card from the television service provider, a second encrypted content stream destined for the host television receiver;

decrypting, by the smart card, the second encrypted content stream to generate a decrypted second content stream;

generating, by the smart card, a second dynamically generated item key specific to the host television receiver;

encrypting, by the smart card, the decrypted second content stream with the second dynamically generated item key to generate a re-encrypted second content stream; and transmitting, by the smart card, the second dynamically generated item key and the re-encrypted second content stream to the host television receiver.

\* \* \* \* \*